July 5, 1966 R. B. FARIS, JR., ET AL 3,259,523
FUEL CELL INCLUDING MEANS FOR CONVERTING
HYDROCARBONS AND SEPARATING HYDROGEN
Filed Dec. 30, 1960
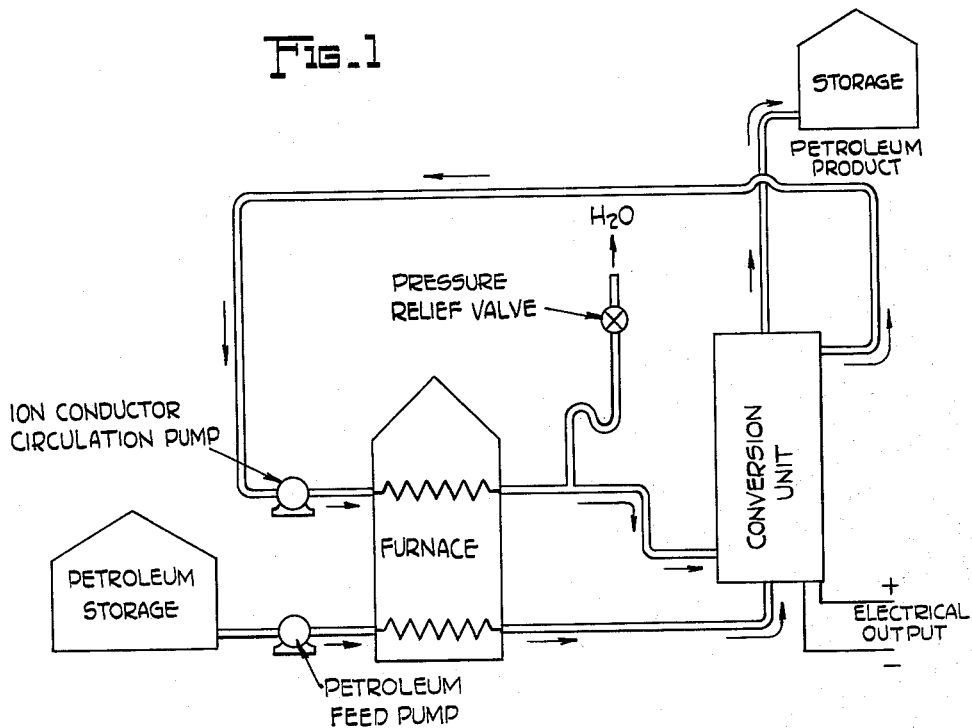
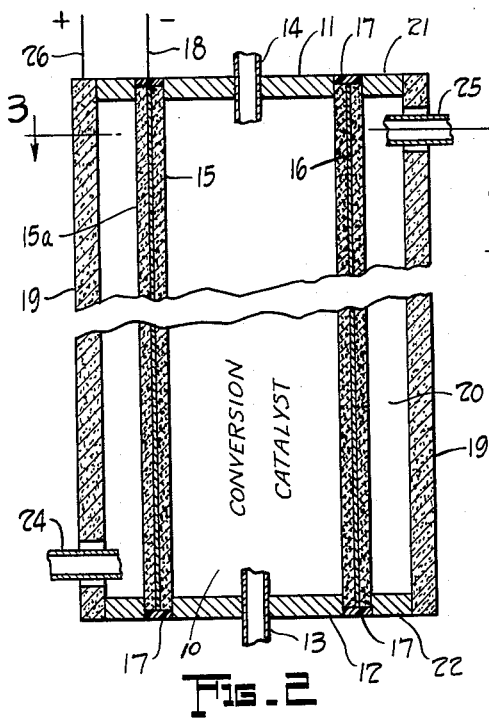
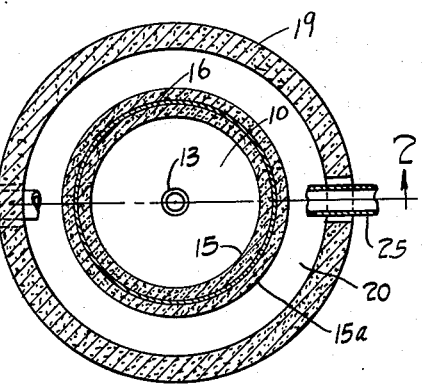
INVENTORS
ROBERT B. FARIS, JR.
ROBERT A. RIGHTMIRE
BY Schramm, Kramer & Sturges
ATTORNEYS.

United States Patent Office 3,259,523
Patented July 5, 1966

3,259,523
FUEL CELL INCLUDING MEANS FOR CONVERTING HYDROCARBONS AND SEPARATING HYDROGEN
Robert B. Faris, Jr., Solon, and Robert A. Rightmire, Twinsburg, Ohio, assignors to The Standard Oil Company, Cleveland, Ohio, a corporation of Ohio
Filed Dec. 30, 1960, Ser. No. 79,904
3 Claims. (Cl. 136—86)

This invention relates to an improved apparatus for the conversion of compounds to various useful products, and more particularly to a conversion apparatus which recovers as useful electrical power energy expended in the production of such products which is normally wasted.

One field of compound conversion is hydrocarbon conversion, e.g. petroleum hydrocarbon cracking or reforming. Numerous processes have been developed for the production of useful conversion products. In general, these processes depend upon thermal decomposition, with or without a catalyst, whereby higher molecular weight hydrocarbon components of a petroleum hydrocarbon, such as straight run gasoline, are decomposed under controlled conditions to produce lower molecular weight products, such as antiknock gasoline, butadiene, ethylene and propylene, to mention a few, and by-product materials, a substantial proportion of which is hydrogen. Under the conditions of conversion normally encountered, the hydrogen involved in the process is frequently admixed with other materials which are not only corrosive, but are also of such nature as to make separation of the hydrogen therefrom largely unprofitable. Thermal catalytic cracking processes which are well known include the Houdry process, the Dubbs process, the Holmes-Manley process, the Donnelly process, the de Florez process, and the Haensel process, the latter being more particularly described in Patent No. 2,479,110.

Conversion processes, such as those mentioned, result in the production of materials which are relatively oxidizable, for example hydrogen. Hydrogen resulting from hydrocarbon conversion procedures, may be analyzed from the products of the conversion reaction, and instead of being lost through burning, the potential energy thereof may be efficiently converted to electrical energy. In order to realize this economical advantage, certain modifications in the conversion apparatus are involved and form the subject matter of the present invention. Recovery of electrical energy depends upon the electrochemical interaction of at least one of such conversion products in an electrochemical reaction apparatus.

The direct conversion of chemical energy into electrical energy is accomplished by causing chemical reactions to take place between electrochemically reactive materials at the junctures between spaced electron conductors and an intermediately disposed ion-containing and conducting medium to form a continuous energy exchange system. The reactive materials are separately supplied to each juncture so that the charge exchange of the reaction takes place ionically through the ion-conductor forming an internal circuit, and electronically through the electron conductor forming an external circuit. Thus, where the reactive materials are continuously supplied and an electrical load is coupled to the external circuit, it is possible to electrochemically convert the energy of chemical reaction directly into electrical energy in the external circuit.

By way of example, where hydrogen is employed as one of the materials, and oxygen as the other, the oxidation and reduction, respectively, of each of these materials at the corresponding juncture between the electronic and ionic conductors generates electrical energy in the external circuit and produces water as a by-product of the reaction. When each of the materials is continuously supplied and consumed within such an apparatus, it may be likened respectively to a fuel and to an anti-fuel, the former of which is selected to yield electrons in its chemical reaction and the latter of which is selected to accept electrons.

Normally, in any such apparatus, the fuel and anti-fuel are supplied in a relatively stable condition and some means is required for activating their conversion from the normally stable reactant state to their reaction product state. It is believed that such conversion of the fuel and anti-fuel takes place by means of chemical adsorption to a chemisorbed state and desorption to their reaction product state at the corresponding junctures between the electron and ion conductors. Such conversion of the fuel and anti-fuel is not practically self-motivating and is, therefore, preferably enhanced by the introduction of some means which will promote adsorption and desorption at each juncture. The reaction products may be removed from the apparatus in any convenient manner and preferably as they are formed.

For the purpose of description of an illustrative electrochemical reaction apparatus for accomplishing the direct conversion of chemical energy to electrical energy a fuel cell will be used. The electron-conductors will be identified as electrodes and more specifically as the anode and cathode respectively, depending upon whether they are on the fuel or anti-fuel side of the cell. The fuel will be identified throughout as any substance which is oxidizable relative to the anti-fuel which will in turn be identified as any substance which is reducible relative to the fuel; where oxidation and reduction, respectively, contemplate the release and acceptance of electrons. The ion conductor will be identified throughout as any medium which is capable of conducting an electrical charge associated with an atom or a group of atoms, i.e., ions, and which, therefore, electronically insulates the electronic conductors from each other in the internal circuit. The junctures between the electrodes and the ion conductor will be identified throughout as interfaces. The activating means for promoting the conversion of the fuel and anti-fuel from their reactant state through the chemisorbed state to the reaction product state will be more specifically identified in conjunction with their functional coaction in the cell and as an adsorber and a desorber. This overall reaction will be referred to as an electrochemical reaction.

In the annexed drawings:

FIG. 1 is a schematic diagram of a plant employing apparatus modified in accordance herewith for the conversion of petroleum to useful conversion products and electrical energy.

FIG. 2 is a diagrammatic illustration showing the one embodiment of the present invention.

FIG. 3 is a top view of the apparatus shown in FIG. 2 taken along the lines 3—3.

Briefly stated, this invention is in the provision of an apparatus for converting a compound into by-products, at least one of which is electrochemically reactive, and electrochemical reaction apparatus integrally coacting therewith, including analyzing apparatus for separating said electrochemically reactive compound from the remaining conversion products. More specifically with relation to hydrocarbon conversion, this invention is in the provision of an improved apparatus for the conversion of hydrocarbons to certain useful hydrocarbons, of lower molecular weight than the original hydrocarbon such as gasoline, butadiene, ethylene,, propylene, etc., by-product hydrogen and electrical energy. The apparatus contemplated with reference to hydrocarbon conversion includes a conversion chamber having means for feeding a hydrocarbon material thereto. In the conversion reaction, a catalyst, e.g. platinum-alumina is contained within the conversion chamber. The walls of the conversion chamber include a barrier which is permeable to the by-product hydrogen, but impermeable to the other conversion products. Coacting therewith is an electron conductor adapted to be connected to an external electric circuit. The barrier and electron conductor are preferably integral. A second electron conducting member is disposed in insulated and spaced relationship to the metallic barrier and is also adapted to be connected to the external circuit. Intermediate opposing surfaces of the two electron conducting members, or electrodes, an ion-containing and conducting medium is supplied which forms an internal circuit between the electrodes. The metallic electrodes, the ion-containing and conducting medium, and the external circuit constitute an electrochemical reaction apparatus, e.g. a fuel cell.

Hydrogen permeating through the hydrogen-permeable barrier and in conjunction with the first electrode provides the fuel for the fuel cell. The spaced apart second electrode, or antifuel electrode is adapted to be contacted with a material which is relatively reducible with respect to such hydrogen, and hence becomes an antifuel therefor, the hydrogen fuel being relatively oxidizable with respect to the antifuel. The ion-containing and conducting medium may conveniently be a fused salt or mixture of salts, particularly where the temperature adjacent the conversion chamber tends to be quite high. When a load is connected into the external circuit, a current will flow as a result of the electrochemical reaction occurring at the respective electrode interfaces with the ion-containing and conducting medium. This electrical current is capable of doing useful work.

Referring now more particularly to FIG. 1, there is shown a schematic flow diagram with the principal components labeled. From the storage tank, petroleum hydrocarbon material is pumped to a furnace of conventional design where the temperature is elevated to a proper degree for the subsequent conversion reaction which occurs in the conversion unit. A conversion unit suitable for use in the apparatus diagrammatically illustrated in FIG. 1, is shown in FIG. 2. Electrical energy is recovered from the conversion unit as hereinafter more particularly described. The conversion products are conducted to a suitable storage.

As previously indicated, the ion-containing and conducting medium of the electrical energy recovery system may be a fused salt which is recirculated through the furnace by means of a circulation pump and continuously supplied to the electrochemical reaction apparatus. Means may also be provided as indicated in FIG. 1 for the removal of exhaust products resulting from the electrochemical reaction, such as water. This reaction product which would be in the form of steam would exit through a pressure relief valve suitably connected to the circulation line.

FIG. 2 shows a conversion chamber in which a thermal and/or catalytic conversion of the petroleum hydrocarbon material may be caused to take place. There is provided a conversion chamber 10 which, in the preferred embodiment has a generally cylindrical figuration, having end closure plates 11 and 12 at the top and bottom, respectively. Bottom closure plate 12 is provided with a suitable inlet tube 13 for the admission of petroleum hydrocarbon material to be converted. Top closure plate 11 is provided with an outlet tube 14 from which conversion products are removed from the apparatus for further treatment in accordance with conventional procedures. The reaction chamber 10 may contain any of the wide variety of catalytic materials commonly employed in conversion procedures such as those mentioned above. In the Houdry conversion procedure, for example, chromia-alumina catalyst is employed, the catalytic agent being supported on pelletized porous alumina supports arranged within the conversion chamber in a manner adapted to provide for optimum contact of the petroleum hydrocarbon material with the catalytic agent. In the normal conversion unit, the side walls of the chamber 10 would be made of steel or some other impervious material adapted to withstand pressures up to 1000 p.s.i. In the preferred embodiment of the present invention, the side wall of the cylindrical chamber 10 is a composite laminar structure composed of a pair of porous ceramic tubular members 15 and 15a telescopically arranged and separated by a thin palladium sheet or foil member 16. Suitable sealers 17 are provided at the junctures of the porous ceramic tubes 15 and 15a and the end closure plates 11 and 12 to prevent escape of gaseous materials therethrough.

The palladium foil member 16 is provided with a suitable lead 18 to one side of an external circuit, not shown, which may, for example, be one side of a motor.

In spaced relation to, and electrically insulated from the palladium foil barrier 16, there is provided an electron conducting member 19 which, in the preferred embodiment is a porous graphite tubular member concentrically disposed with respect to the composite tubular member 15–16–15a. The space between tubular members 15–15a and 19 is an external chamber 20 which is adapted to contain an ion-containing and conducting medium. This medium may, as indicated, be a fused salt, or preferably a fused mixture of salts. To enclose the chamber, a top sealing ring 21 and a bottom sealing ring 22 are provided, these being fashioned of steel, or any other suitable material which is non-reactive with a fused ion-containing and conducting medium. The sealing means 17 also prevent loss of the ion-containing and conducting medium through the pores of the outer porous ceramic tubular member 15a. In the preferred embodiment, the ion-containing and conducting medium is continuously circulated through the apparatus and accordingly, an inlet tube 24 is provided through the electron conductor 19 and an outlet tube 25 also provided at a point remote from the inlet. As in the case of the metallic barrier 16, an electrical lead 26 from the porous graphite electron conductor is adapted to be connected to an external circuit, such as the other side of the motor not shown, but mentioned above.

FIG. 3 shows the embodiment of FIG. 2 in a top sectional view.

The composite wall 15–16–15a of the conversion chamber 10 composed, as indicated above, of two layers of porous ceramic material which have a thin continuous layer of metallic palladium foil 16 serving as a barrier to prevent loss of the reactant materials and reaction products from the reaction chamber 10. However, this metallic barrier 16 is selectively permeable to hydrogen, a by-product of the conversion reaction. Any other metal which has the property of analyzing a fuel reactant from a combination including the fuel, as by permitting selective diffusion of hydrogen therethrough, may be used in place of palladium. Such metals include iron, niobium, columbium and tantalum in thin sheets. The inner porous ceramic tube 15a provides pressure withstanding mechanical rigidity for the wall of the reaction chamber and support for the thin metallic barrier 16. At the same time the reaction products of the conversion reaction have ready access to the hydrogen permeable metal barrier 16. Another function of the porous ceramic material 15–15a is to provide electrical insulation for the metallic barrier at the points of juncture with the end pieces 11 and 12. The end pieces 11 and 12 and the sealing rings 21 and 22 may be fabricated of alloy steel or any other material appropriate to the conditions of use. If necessary, additional mechanical strength may be provided for the ceramic tube members 15 and 15a by the incorporation of metallic reinforcing bars completely within the body of the ceramic material or by means of heavy metal screening adjacent to or fused on the surface of the reaction chamber side of the internal ceramic tube 15.

The external chamber 20 is, as indicated above, adapted to receive and contain ion-containing and conducting medium for the integrated fuel cell. In the particular embodiment illustrated in FIGS. 2 and 3, the ion-containing and conducting medium is a fused hydroxide type, such as a fused eutectic mixture of NaOH and KOH which melts at about 250° C. at which temperature the cell may operate under normal pressure. The fused oxide also has the function of acting as a heat exchange medium for maintaining the required reaction temperature within the conversion chamber 10. As indicated in FIG. 1, this may be accomplished by circulating the ion-containing and conducting medium between the conversion unit of FIGS. 2 and 3 and the same furnace which is used to preheat the petroleum feed stream before entry to the processing chamber through the inlet 13. The necessary thermal insulating material will be applied, of course, to the equipment where necessary in accordance with good plant construction practice, and such details will not be further described herein.

As indicated above, the circulation of the ion-containing and conducting medium additionally provides a means for removing unwanted by-products of the electrochemical reaction occurring in the integrated fuel cell and conveniently exhausting them from the circulating ion transfer medium at a point external to the fuel cell as shown in FIG. 1.

In one modification of the preferred embodiment, the circulaion of the ion-containing and conducting medium may be carried out in such a manner that the external chamber 20 is maintained at something less than atmospheric pressure to provide a driving force for the diffusion of external air through the porous carbon electron conducting member 19 into the interface between the ion-containing and conducting medium and the inner surface of the electron conducting member 19 for electrochemical reaction thereat. Reduced pressure within the apparatus also provides an incremental addition to the driving force for the diffusion of hydrogen through the hydrogen permeable metallic barrier 16. If the driving force of atmospheric pressure or the differential pressure as above described is insufficient to supply oxygen antifuel at the interface between the electron conducting member 19 and the ion-containing and conducting medium disposed within the external chamber 20, the unit shown in FIGS. 2 and 3 may be surrounded by an additional cylindrical external shell, not shown, fabricated of mild steel or any other suitable material, and the antifuel, or relatively reducible material with respect to the hydrogen fuel, supplied under a pressure sufficiently high to provide the required rate of diffusion through the porous carbon electrode 19.

Instead of a circulating ion-containing and conducting medium, static media such as liquid, or ion permeable membrane types may be utilized so long as they are compatible with the general operating conditions of the unit. Where static media are employed, suitable means may be provided to remove the unwanted products from the external chamber 20, and the required processing temperatures are provided by electrical or other conventional heating means.

In the operation of the combined unit for hydrocarbon conversion and the production of electrical energy, in accordance herewith the proper catalyst for the desired hydrocarbon conversion reaction is charged to the conversion chamber 10. The dual function heat exchange medium and fuel cell ion-containing and conducting medium is charged to the circulating system illustrated in FIG. 1. The hydrocarbon feed stream to be upgraded is preheated and, in the conversion chamber, catalytically and thermally converted to useful hydrocarbon products, such as gasoline, butadiene, ethylene and propylene, or the like, and by-product hydrogen. The gaseous materials at the conversion temperature of about 495° C. and at a pressure of 50 to 1,000 p.s.i.g., in the reaction chamber penetrate the inner porous ceramic layer 15 of the composite conversion chamber wall. Only the gaseous hydrogen diffuses through the metallic barrier (palladium foil barrier) while the remaining gaseous materials are retained in the reaction chamber and pass out through the outlet tube 14 to any necessary further processing or to storage. As the hydrogen emerges from the palladium metal barrier 16, it undergoes electrochemical reaction at the interface between the ion-containing and conducting medium which has penetrated the external porous ceramic layer 15a to the metallic barrier 16.

Atmospheric oxygen diffuses through the porous carbon external wall 19 surrounding the outer chamber 20 and reacts at the internal surface of the porous carbon electron conducting member 19 electrochemically. Appropriate leads 18 and 26 conduct the resultant electrical current to the point of local use or to transmission lines for remote utilization.

As a specific illustrative example of the mode of using the apparatus of the present invention, Houdry dehydrogenation catalyst which is in the form of cylindrical pellets of chromia-alumina is charged to the reaction chamber, and a molten dual function mixed salt heat exchange medium and ion transfer medium composed of parts of NaOH and parts of KOH is circulated through the preheat furnace and the combination conversion unit external chamber 20. The hydrocarbon feed material composed of 97.8% n-butane and 2.2% isobutane is preheated to reaction temperature between 900–1000° F. and passed through the reaction chamber of the combination unit at a rate of 2.0 liquid volumes per volume of catalyst per hour at atmospheric pressure or slightly below. This type of operation produces 22.4% based on the fresh feed of butadiene for use in producing synthetic rubber or other polymer applications, 24.8% of butylene-2 for alkalation feed or petrochemical use 5.3% of by-product hydrogen which in the present apparatus becomes the fuel of a fuel cell, and minor percentages of various other light hydrocarbons which may be burned as fuel gas.

This yield of by-product hydrogen with a fuel cell efficiency of 75–80% will produce approximately 130 kwh. of electricity for each barrel of liquid butane fed to the combination unit of the present invention. On the basis of a 2,000 barrel per day plant, which is a very moderate size for this type of installation, the potential energy in the by-product hydrogen is approximately 264,000 kwh. for each day's operation.

Palladium foil which is particularly useful herein may be obtained in very thin continuous sheet ranging in size from 0.001" to 0.01" thick. The pore size of the ceramic supporting walls will depend upon the nature of the clay from which the wall is made, the moisture content, firing conditions, etc., and will for most purposes be found suitable for use herein with pore sizes between about 50 and 200 millimicrons.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. An apparatus for producing electrical energy comprising in combination at least a pair of spaced polygonal walls defining a plurality of chambers, means for feeding a hydrocarbon into one of said chambers, said chamber including means for thermally converting said hydrocarbon to non-hydrogen and hydrogen by-products, the wall of said hydrocarbon-conversion chamber including electrode-barrier means permeable to hydrogen only for introduction into said other chamber, said electrode-barrier means including a pair of coaxially disposed porous ceramic members in spaced laminar relation and having a thin continuous sheet of palladium disposed in the space therebetween, said electrode-barrier means being adapted to be connected to an external circuit, and to coact with said hydrogen to accept electrons therefrom, second electrode means in insulated and spaced relationship to said electrode-barrier means and connected to the other wall and also adapted to be connected to an external circuit, and means for supplying an antifuel to said second electrode.

2. An apparatus for producing electrical energy comprising in combination at least a pair of spaced polygonal walls defining a plurality of chambers, means for feeding a hydrocarbon into one of said chambers, and said chamber including means for thermally converting said hydrocarbon to non-hydrogen and hydrogen by-products, the wall of said hydrocarbon-conversion chamber including electrode-barrier means permeable to hydrogen only for introduction into said other chamber, said electrode-barrier means including a pair of concentrically disposed porous ceramic tubes in spaced laminar relation and having a thin continuous sheet of palladium disposed in the space therebetween, said electrode-barrier means being adapted to be connected to an external circuit, and to coact with said hydrogen to accept electrons therefrom, second electrode means in insulated and spaced relationship to said electrode-barrier means and connected to the other wall and also adapted to be connected to an external circuit, and means for supplying an antifuel to said second electrode.

3. An apparatus for producing electrical energy comprising in combination at least a pair of spaced polygonal walls defining a plurality of chambers, means for feeding a hydrocarbon into one of said chambers, and said chamber including means for thermally converting said hydrocarbon to non-hydrogen and hydrogen by-products, the wall of said hydrocarbon-conversion chamber including electrode-barrier means permeable to hydrogen only for introduction into said other chamber, said electrode-barrier means including a pair of porous ceramic members in spaced laminar relation and having a thin continuous sheet of metal in sandwiched relation with said ceramic members, said metal sheet being permeable to hydrogen and impermeable to non-hydrogen by-products disposed in the space therebetween, said electrode-barrier means being adapted to be connected to an external circuit and to coact with said hydrogen to accept electrons therefrom, second electrode means in insulated and spaced relationship to said electrode-barrier means and connected to the other wall and also adapted to be connected to an external circuit, and means for supplying an antifuel to said second electrode.

References Cited by the Examiner

UNITED STATES PATENTS

| | | | |
|---|---|---|---|
| 1,124,347 | 1/1915 | Snelling | 183—115 |
| 2,384,463 | 9/1945 | Gunn et al. | 136—86 |
| 2,773,561 | 12/1956 | Hunter | 183—115 |
| 2,901,523 | 8/1959 | Justi et al. | 136—86 |
| 2,901,524 | 8/1959 | Gorin | 136—86 |
| 3,080,442 | 3/1963 | Hobert | 136—86 |

FOREIGN PATENTS 521,773  5/1940  Great Britain.

WINSTON A. DOUGLAS, *Primary Examiner.*

JOHN R. SPECK, JOHN H. MACK, *Examiners.*

H. FEELEY, A. B. CURTIS, *Assistant Examiners.*